US011074420B2

(12) United States Patent
Zolotow et al.

(10) Patent No.: US 11,074,420 B2
(45) Date of Patent: Jul. 27, 2021

(54) SELF-LEARNING INPUT-DRIVEN BROKERING OF LANGUAGE-TRANSLATION ENGINES

(71) Applicant: INTERNATIONAL BUSINESS MACHINES CORPORATION, Armonk, NY (US)

(72) Inventors: Clea Anne Zolotow, Key West, FL (US); John Davis, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 16/451,909

(22) Filed: Jun. 25, 2019

(65) Prior Publication Data

US 2020/0410058 A1 Dec. 31, 2020

(51) Int. Cl.
*G06F 17/00* (2019.01)
*G06F 40/58* (2020.01)
(Continued)

(52) U.S. Cl.
CPC .............. *G06F 40/58* (2020.01); *G06F 40/30* (2020.01); *G06F 40/51* (2020.01); *G06F 40/55* (2020.01)

(58) Field of Classification Search
None
See application file for complete search history.

(56) References Cited

U.S. PATENT DOCUMENTS 7,957,953 B2 * 6/2011 Moore ..................... G10L 15/04
704/2
8,660,836 B2 * 2/2014 Castelli ................... G06F 40/44
704/8

(Continued)

FOREIGN PATENT DOCUMENTS

| CN | 106021239 A | 10/2016 |
|---|---|---|
| JP | 64485472 A | 2/2016 |
| WO | 20171729461 W | 10/2017 |

OTHER PUBLICATIONS

Erichsen, Gerald; Which Online Translator Is Best?; ThoughtCo.; Nov. 29, 2017; https://www.thoughtco.com/which-online-translator-is-best-3079285?; 4 pages.

(Continued)

*Primary Examiner* — Satwant K Singh
(74) *Attorney, Agent, or Firm* — Schmeiser, Olsen & Watts; Christopher M. Pignato

(57) ABSTRACT

A self-learning translation-engine brokering system characterizes a set of language-translation engines by associating each engine with values of a set of engine parameters. The system receives a request to translate text or speech input, along with a set of weightings that identify the relative importance of each engine parameter to the translation requester. The system formats the input into a quantifiable (Continued)

engine-agnostic form and performs an optimization procedure that finds the best fit between the source's weightings and the sets of engine parameters. The system directs the input to the best-fitting translation engine, receives the translated output from the selected engine, directs the output to the translation requester, and then determines how well the translated output meets user expectations. This feedback used to update the best-fitting engine's parametric values and to train the system to make more accurate selections in the future.

20 Claims, 7 Drawing Sheets

(51) Int. Cl.
    *G06F 40/30*     (2020.01)
    *G06F 40/51*     (2020.01)
    *G06F 40/55*     (2020.01)

(56) References Cited

U.S. PATENT DOCUMENTS

| | | | |
|---|---|---|---|
| 8,713,037 B2* | 4/2014 | Nikoulina | G06F 40/51 707/760 |
| 10,108,611 B1 | 10/2018 | Pierard | |
| 2005/0086044 A1 | 4/2005 | Hess | |
| 2007/0083357 A1* | 4/2007 | Moore | G06F 40/45 704/4 |
| 2014/0100950 A1 | 4/2014 | Gross | |
| 2018/0373706 A1 | 12/2018 | Miklosch | |

OTHER PUBLICATIONS

Gimenez, Jesus et al.; Linguistic measures for automatic machine translation evaluation; Machine Translation vol. 24, Issue 3-4; Dec. 2010; pp. 209-240.

Yunker, John; Google, Bing and Babelfish: What's the best translation engine?; Global by Design; May 17, 2010; https://globalbydesign.com/2010/05/17/google-bing-and-babelfish-whats-the-best-translation-engine/; 7 pages.

* cited by examiner

SELF-LEARNING INPUT-DRIVEN BROKERING OF LANGUAGE-TRANSLATION ENGINES

BACKGROUND

The present invention relates in general to automated language-translation technology and in particular to optimized selection of translation engines.

Language-translation applications translate written or spoken words, phrases, and natural language statements from one natural language, such as English, Dutch, or Spanish, into one or more other natural languages. These applications can be implemented in a variety of forms, such as interactive or real-time tools that translate a speaker's words as the user speaks the words or types the words into a computerized user interface, document translators that translate language stored in drafted documents, or automated systems that perform translation tasks in response to requests received from other applications or systems.

The actual translation tasks performed by such applications are implemented by a translation-engine component. Translation engines differ greatly in performance, accuracy, resource-efficiency, and in other ways, and may have been tuned to work best with certain input or output languages, prose styles (such as conversational speech, classical literature, scientific or medical publications, Web-site postings, or news articles), or readability (as measured by a standard like the Flesch Reading Ease Readability Formula). One engine may thus be better suited than another to translate certain types of input or output or may have been tuned to better satisfy the translation requirements of a particular user, business, or associated application.

Translation engines also differ in other ways. For example, an engine implemented as an open cloud service on a public Web site would be less well-suited to translate confidential legal records than would a password-protected engine capable of being run on a local, secured server.

For all these reasons, a business or other enterprise user may need to invest in multiple translation services that are each best suited for a particular type of input or application. In such cases, an engine is generally chosen for a particular translation job by a human user or administrator.

SUMMARY

Embodiments of the present invention comprise systems, methods, and computer program products for a self-learning translation-engine brokering system. The system characterizes a set of language-translation engines by associating each engine with values of a set of engine parameters. When the system receives a request to translate text or speech input from a user or other input source, the system also receives contextual information that includes a set of weightings that specify the relative importance of each engine parameter to the translation requester or other input source. The system formats the input into a quantifiable engine-agnostic form that represents linguistic characteristics of the input and performs an optimization procedure that may use generally accepted optimization functions to determine which set of engine parameter values best fits the source's weightings. The system directs the input to the best-fitting translation engine and then determines how well the resulting translated output meets user expectations defined by the weightings. This feedback may be used to update the best-fitting engine's parameter values and to update a machine-language knowledgebase to better train the system to make more accurate selections in the future.

DETAILED DESCRIPTION

Figure 1:
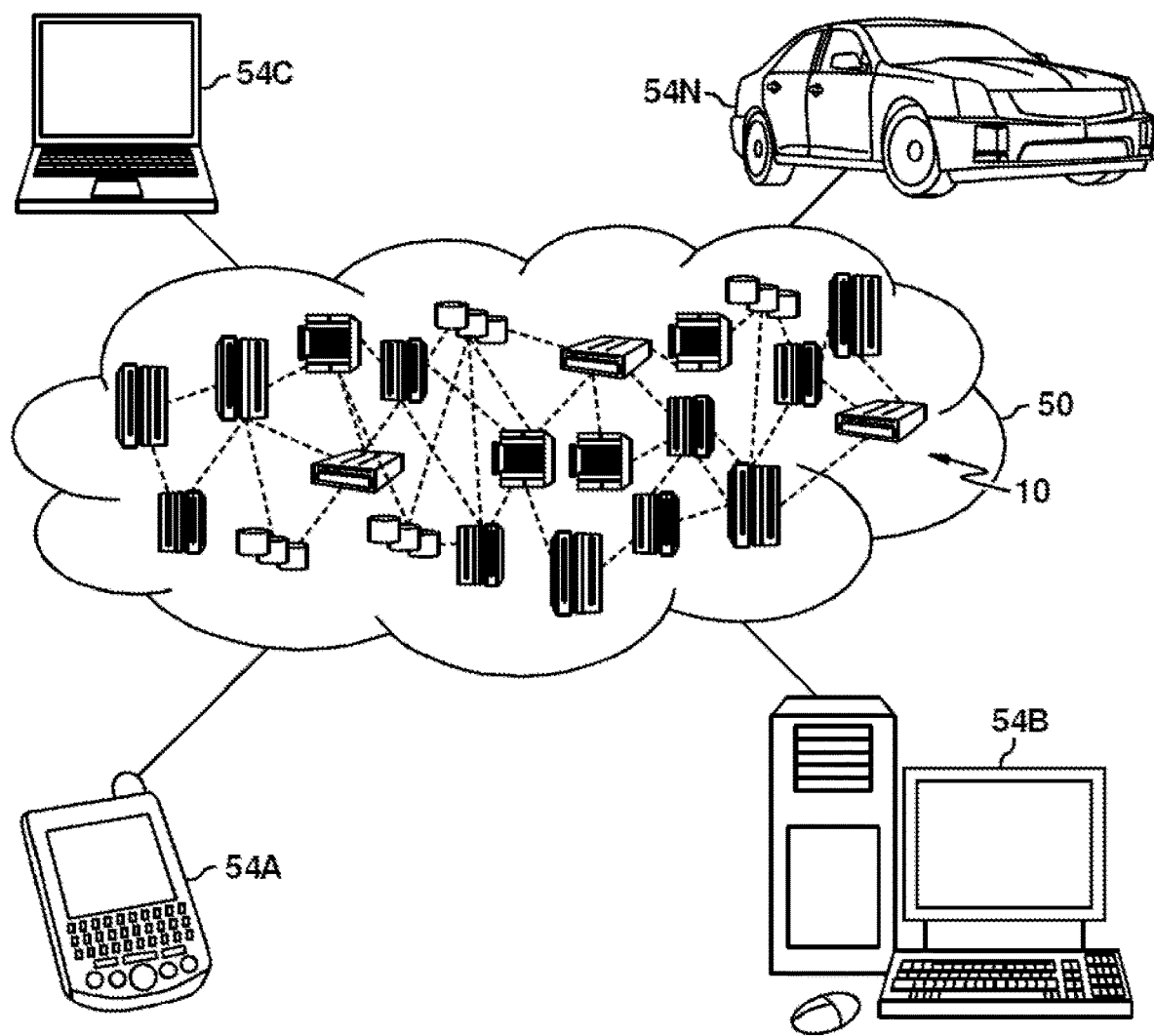
FIG. 1 depicts a cloud computing environment according to an embodiment of the present invention.

Embodiments of the present invention provide translation-engine brokering systems that use cognitive analytics, machine-learning, or other artificially intelligent technologies to automatically select a language-translation engine best suited to perform a particular translation task for a particular user or other input source. These brokering systems may be implemented as a middleware component of a language-translation system or user interface, as a stand-alone application, or as an on-demand or hosted service.

Embodiments may determine which engine to choose as weighted functions of certain characteristics of the content to be translated—such as the language or prose style of the input or the desired language of the output—and as weighted functions of preferences or requirements specified by the input source, such as cost, speed, security, or resource-efficiency. This feature may be especially important when a particular translation job is associated with security, privacy, or confidentiality constraints. In such cases, embodiments may additionally consider, when selecting an engine, whether selecting that engine would require insufficiently secured transfer of secure data or whether the selected engine operates in, or is hosted by a platform that operates in, an unauthorized region of the world.

Embodiments also offer a self-learning feedback feature, from which the improved brokering system learns how to more accurately select an optimal engine by analyzing the output of previous translation jobs and by determining how well previously selected engines satisfied specified requirements.

Known translation engines do not perform consistently for all translation tasks and may, for example, be tailored to be faster, more resource-efficient, more cost-effective, or more accurate when translating a certain input language to a certain output language or when translating from a specific input medium or style of language—such as spoken word, written text, scientific literature, medical publications, news articles, or photo captions—to a specific output medium or style of language. Furthermore, one engine's speed, efficiency, cost, accuracy, security, or other characteristic may be superior to that of other engines across the board, regardless of input or output languages.

Embodiments provide an intelligent, self-learning, translation broker that optimizes values of a set of parameters in order to select a translation engine that provides the best match for the optimized parameters. For example, if a user that has provided weighted preferences for a certain level of performance, security, and resource efficiency submits a certain English-to-French translation task, the improved translation broker will optimize the particular combination of user-specific and input-specific parameters and then select a translation engine known to have characteristics that best match the optimized values. The system then transparently forwards the English input to the selected engine. Embodiments may implement similar procedures for translation jobs that translate input content into more than one output language.

In certain embodiments, the system also performs a quality analysis on the French-language output, determining how well the output satisfies user requirements. This analysis is then used to further train components of the embodiment, through methods of machine-learning, to more accurately select engines in the future.

These features are improvements over current translation-engine technologies, including any that attempt to automatically select, or broker, translation engines based on fixed parameters or manually entered requirements. Embodiments of the present invention broker translation engines without requiring human intervention and, depending upon the sophistication of the embodiment's machine-learning components, may operate entirely without human input, automatically teaching itself how to effectively broker translation engines even when changes occur in the availability of certain candidate engines, in a characteristic of a particular candidate engine, in a characteristic or a trend in user input, or in a particular user's requirements or preferences.

This frees a business or other from the need to evaluate or potentially purchase multiple redundant translation tools and increases the likelihood that the business will always use the available translation technology best suited for each job and most likely to satisfy job-specific and business-related requirements and preferences.

Embodiments of the present invention also improve upon known translation technologies and upon any current translation-brokerage applications in that embodiments teach themselves how to optimize selection criteria as a function of characteristics of input language. In other words, one advantage of embodiments of the present invention is their ability to recompute optimized values of selection parameters for a particular translation job as a function of characteristics of that job, including combinations of specialized requirements for security, performance, accuracy, or cost. This allows the improved translation system to be trained to recognize terminology, phrasing, and other linguistic attributes that are common to the business or that have proprietary meaning.

These features provide additional benefits to a business or user that has purchased multiple engines or that has a choice of multiple translation services. Regardless of whether the business must pay an external service provider for each translation task or must bear the cost of resources consumed by an engine, an embodiment can improve overall efficiency or accuracy of the business's translation services by intelligently selecting a most efficient, secure, accurate, or fast engine without human intervention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
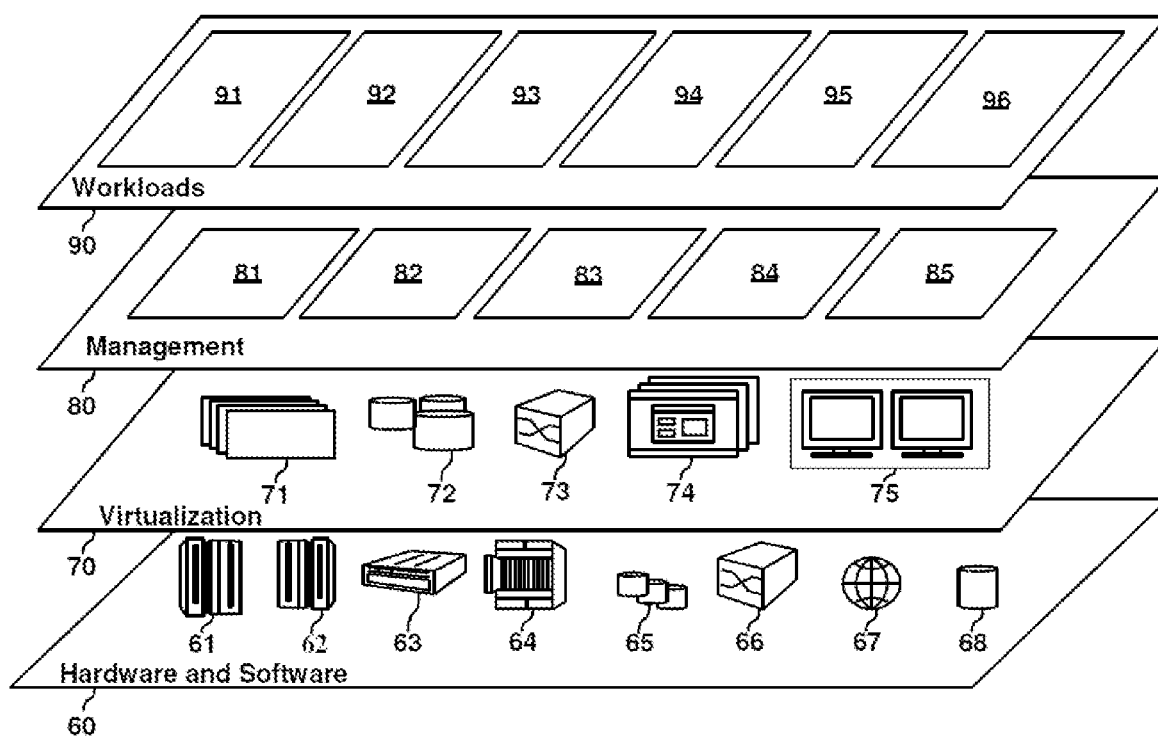
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and knowledgebase software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of a complex self-learning, input-driven broker for language-translation engines.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
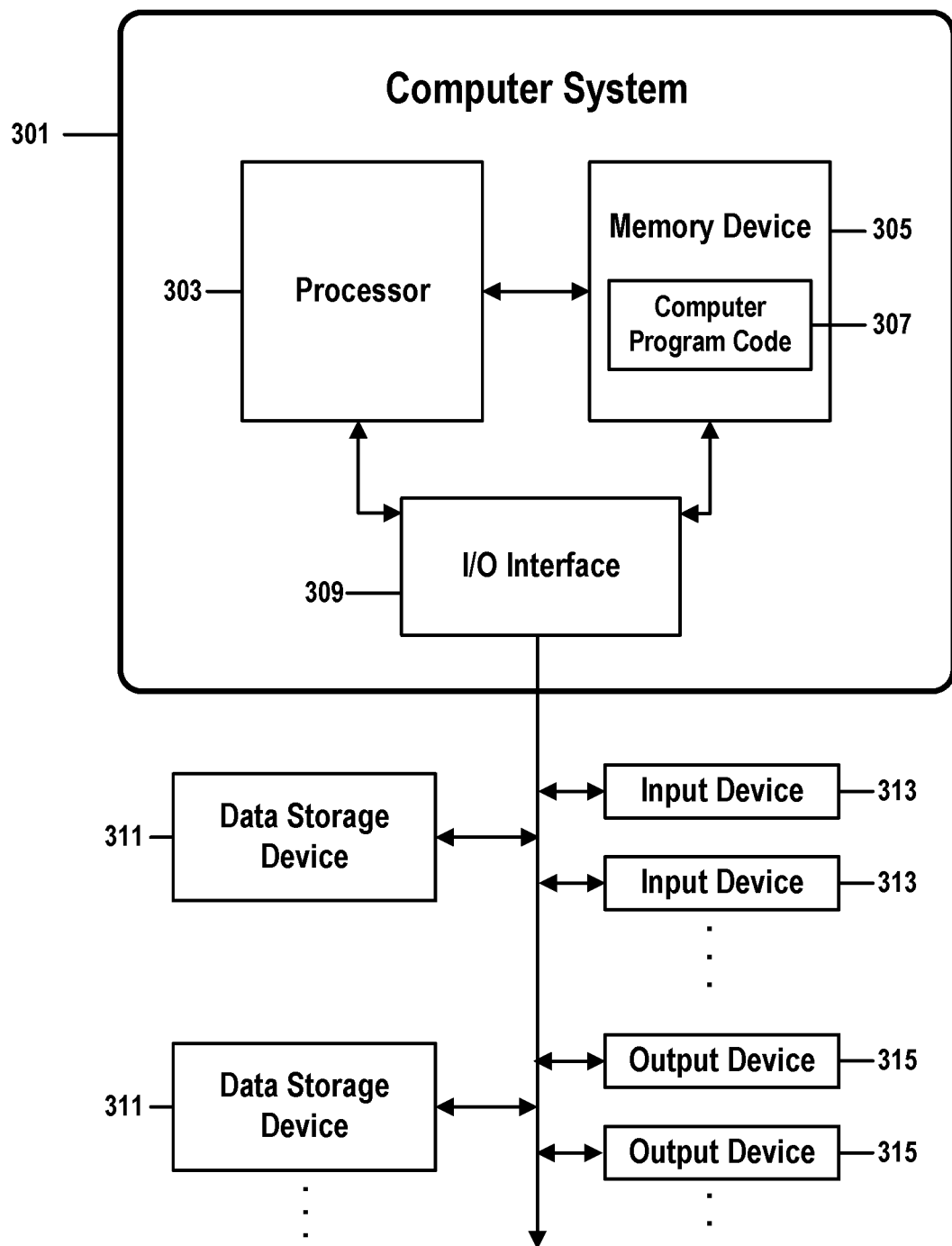
FIG. 3 shows the structure of a computer system and computer program code that may be used to implement a method for self-learning input-driven selection of language-translation engines in accordance with embodiments of the present invention.

FIG. 3 shows a structure of a computer system and computer program code that may be used to implement a method for self-learning input-driven selection of language-translation engines in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for self-learning input-driven selection of language-translation engines in accordance with embodiments of the present invention, and may implement other embodiments described in this specification, including the methods illustrated in FIGS. 1-7. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware, or may be accessed by processor 303 directly from such firmware, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for self-learning input-driven selection of language-translation engines.

Any of the components of the present invention could be created, integrated, hosted, maintained, deployed, managed, serviced, supported, etc. by a service provider who offers to facilitate a method for self-learning input-driven selection of language-translation engines. Thus the present invention discloses a process for deploying or integrating computing infrastructure, comprising integrating computer-readable code into the computer system 301, wherein the code in combination with the computer system 301 is capable of performing a method for self-learning input-driven selection of language-translation engines.

One or more data storage devices 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for self-learning input-driven selection of language-translation engines may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for self-learning input-driven selection of language-translation engines is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
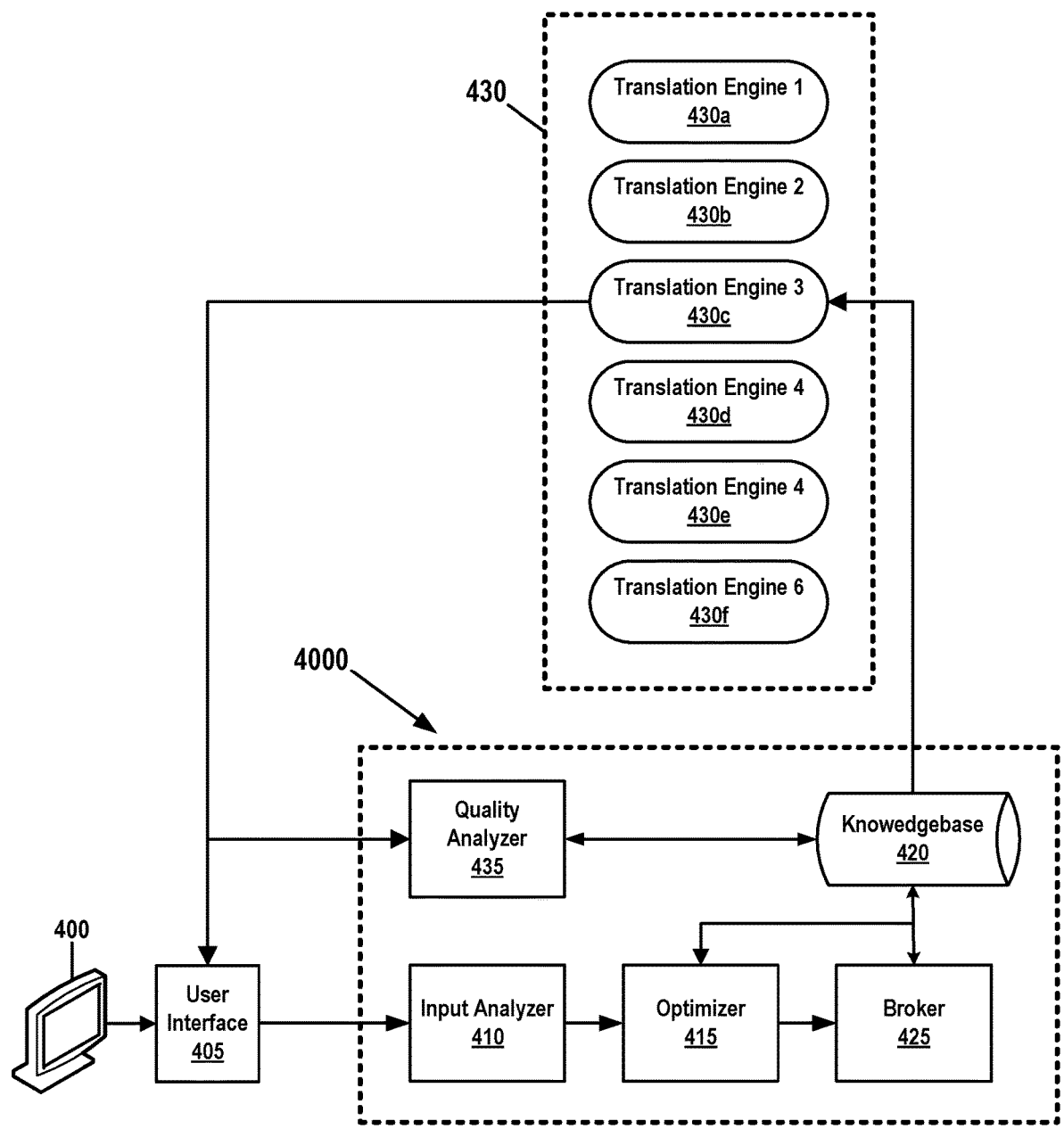
FIG. 4 shows a structure and associated components of a self-learning, input-driven broker for language-translation engines, in accordance with embodiments of the present invention.

FIG. 4 shows a structure and associated components of a self-learning, input-driven broker 4000 for language-translation engines, in accordance with embodiments of the present invention. FIG. 4 shows items 400-435 and 4000, which may be implemented on platforms shown in FIGS. 1-3.

Brokering system 4000 receives input content from a source 400 through a system interface 405. Depending on implementation details, source 400 and system interface 405 can include any type of language input source or input-submission mechanism known in the art, including interactive human voice or text input entered through a computerized user interface; electronic submission of a repository of previously stored text files, audio speech recordings, or other types of documents; or an automated request for translation services or tasks made by a hosted cloud service or a client system of a client-server or other distributed computing architecture.

Input received from source 400 is initially processed by an input analyzer module 410 of system 4000. Analyzer 410 performs linguistic, semantic, syntactical, or other analytic procedures of the input content. This procedure characterizes the input by setting values of certain parameters that characterize the input, such as the input's readability or grade-reading level, length, density of idiomatic language, language, or prose style.

In some embodiments, the analyzer 410 may infer certain of these parameters through knowledge of characteristics of content previously entered by the same source 400. For example, if the input content 400 is the latest issue of a medical journal, analyzer 410 may assume that parameters like readability, language, and vocabulary should be set to values similar to those inferred when previous issues had been submitted as input. This latter feature may be especially useful when verbal input content, such as speech or text, entered in real time by a human user through an interactive user interface. In this latter case, even if analyzer 410 does not initially have a quantity of input sufficient to support valid inferences, analyzer 410 may supplant its analysis of the current input content with the results of prior analyses of similar content, or of content previously received from similar users.

Input analyzer 415 also receives from source 400, or retrieves from previously stored records, a set of preferences or requirements associated with source 400. These requirements are specific to the source and may be specific to the received input. For example, the requirements could specify one or more output languages to which the input content should be translated.

The requirements may also specify the source's weighted preferences, requirements, or priorities when performing a translation. In some embodiments, a source may specify several sets of preferences, requirements, or priorities that each apply to a particular class of input.

For example, a university physics department may specify that translations of papers delivered at a particular annual conference must be translated from German to English, and that accuracy should be given the highest priority, translation cost the second-highest priority, and translation speed the lowest priority. A marketing department of the same university may specify that, when translating any of those same papers, output should be generated in English, Spanish, and French, cost should be the highest priority and accuracy should be considered minimally important. When translating current news articles published on an astrophysics Web site, the physics department might have specified yet another set of preferences driven by the need to distribute the article content as quickly as possible to faculty members around the world. In this case, the department might have specified that the articles should be translated as quickly and accurately as possible, without regard to cost, into idiomatic French, German, Dutch, Spanish, and English.

Optimizer 415 identifies the candidate engine 430a-430f that best meets the translation job's requirements. Optimizer 415 may perform this function through any means known in the art and desired by an implementer. For example, optimizer 415 may perform a simple pattern-matching comparison of input and engine parametric values or, if a more nuanced analysis is desired, may perform a multivariate optimization function on a combination of the parametric values derived by input analyzer 410 to characterize the input content with the requirements specified by the input source. Such an optimization operation might then yield optimal, minimized values of a combination of variables that represent the input characteristics and the source preferences.

Broker 425 matches the optimized values to select a translation engine 430c from a set 430 of candidate translation engines 430a-430f. This election is performed by selecting an engine that the system has previously learned is most capable of satisfying the optimized combination of preferences and content characteristics that characterize the current translation job.

Although FIG. 4 shows only six candidate engines 430a-430f, embodiments of the present invention are flexible enough to accommodate implementations comprising any combination or number of engines desired by an implementer.

Broker 425 is able to make this selection by referring to knowledge contained in knowledgebase 420, which contains axioms, concept dependencies, and other information inferred from historical records of each translation's past performance. In effect, quality analyzer 435 or a related machine-learning module of system 4000 may continue to train broker 425 by fine-tuning or updating the information stored in knowledgebase 420, based on continuous analysis of each engine's ability to satisfy user needs. This training allows self-learning broker 425 to base future engine selections on more current or more refined criteria.

For example, if translation engine 2 430b has in the past produced more accurate French-to-Swahili translations of medical journal articles, knowledgebase 420 might contain an axiom or rule that weights the choice of a translation engine when performing similar translation tasks toward a selection of engine 2 430b.

Figure 7:
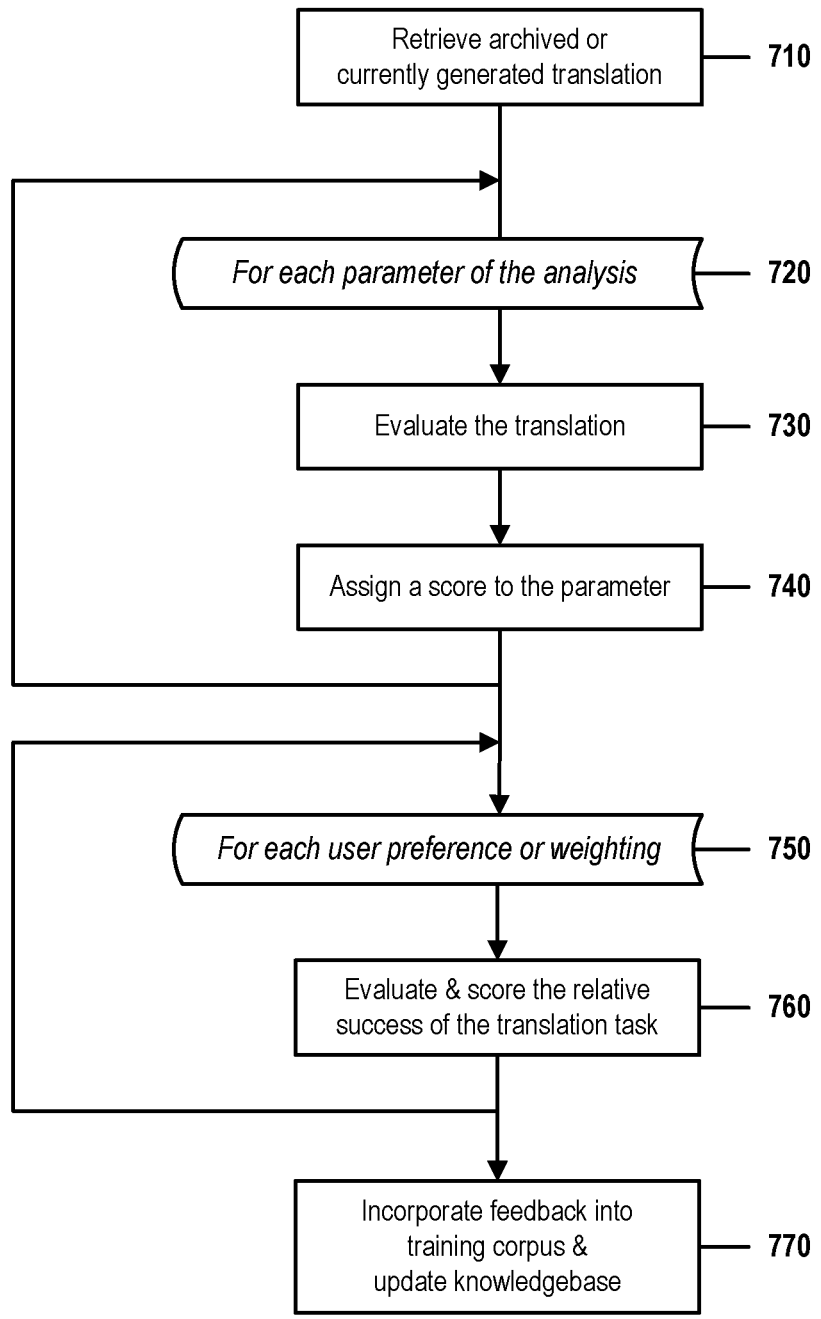
FIG. 7 is a flow chart that shows steps of a method for training a self-learning input-driven language-translation broker in accordance with embodiments of the present invention.

Knowledgebase 420 may be initially populated by a human implementer or administrator, but once a self-learning implementation of translation-broker system 4000 is put into production, the system will begin accumulating logs of each transaction job in order to train itself by means of the method of FIG. 7. These logs may be augmented by additional records of operational characteristics of engines 430a-430f or of other engines that are similar or identical to any of engines 430a-430f. As time goes on, the knowledge stored in knowledgebase 420 will continue to become more refined, enabling optimizer 415 and broker 425 to make increasingly accurate selections of translation engines that best satisfy the preferences or requirements of each source of input content.

Quality analyzer module 435 intercepts and analyzes the output of selected translation engine 3 430c. By applying known methods of linguistic, semantic, syntactical, or other types of analysis, quality analyzer 435 determines how well engine 3 430c has satisfied the requirements of a current translation task. Analyzer 435 then uses this information to update knowledgebase 420, enabling optimizer 415 or broker 425 to more accurately select a translation engine the next time that engine 3 430c is a candidate.

Figure 5:
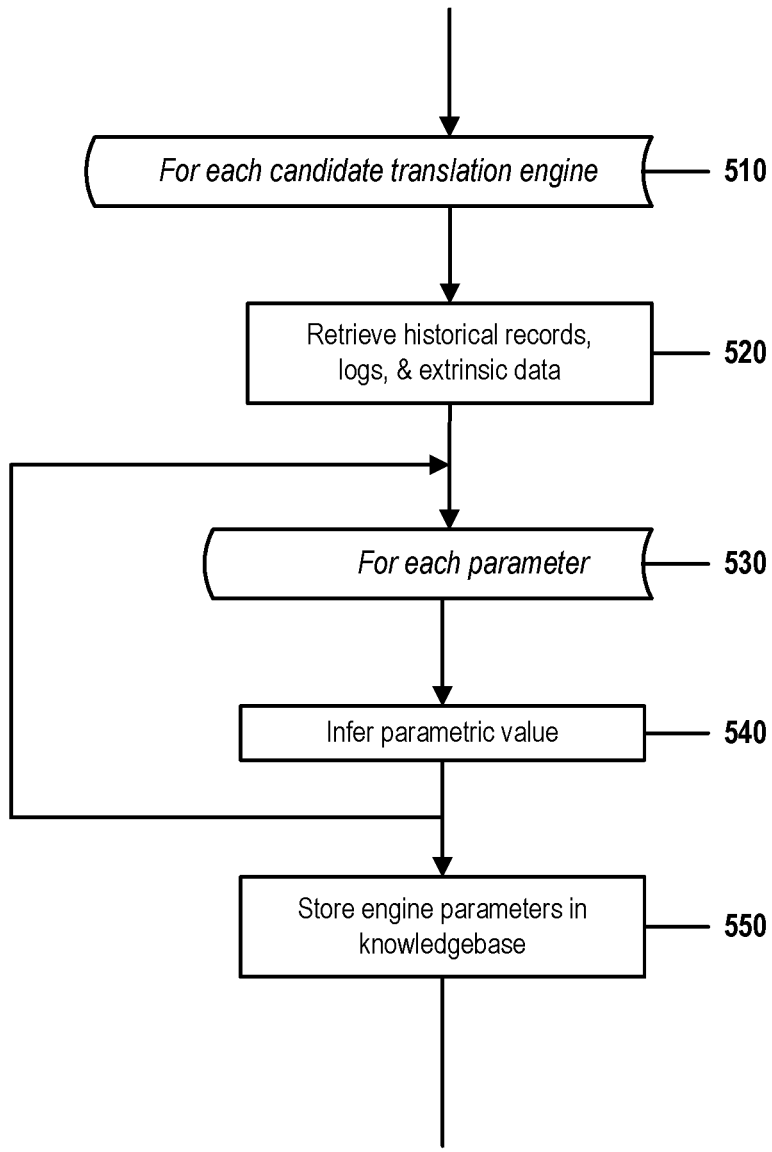
FIG. 5 is a flow chart that illustrates steps of a method for intelligently characterizing translation engines, in accordance with embodiments of the present invention.

FIG. 5 is a flow chart that illustrates steps of a method intelligently characterizing translation engines, in accordance with embodiments of the present invention. FIG. 5 contains steps 510-550 which may be performed by embodiments that incorporate the structures of FIGS. 1-4.

This method may be performed by any module of translation-engine brokerage system 4000 that incorporates a method of cognitive analytics or any other artificial-intelligence technology capable of performing inferential analysis on historical records. In some embodiments, for example, the method of FIG. 5 may be performed by the input analyzer 410, optimizer 415, broker 425, or quality analyzer 435 module of system 4000, or may be performed by a distinct machine-learning subsystem of system 4000 that is not shown in FIG. 4. In some cases, especially during the early implementation stages when system 4000 is still being designed and configured, or has not yet been extensively trained with production data, the method of FIG. 5 may be partially performed by a human designer, implementer, or administrator.

Step 510 begins an iterative procedure of steps 510-550, which repeats for each candidate translation engine to which a translation job may be routed, such as the exemplary engines 430a-430f shown in FIG. 4.

In step 520, translation-engine brokerage system 4000 retrieves information that describes a pattern of characteristics of, or behavior displayed in the past by, the translation engine currently being evaluated. This information may be gathered from any source known in the art, such as from logs of previous translation jobs performed by the current engine prior to the implementation of brokerage system 4000, external records of translation jobs performed by engines similar to the current engine, or previous translation jobs managed by the brokerage system 4000 itself.

These records may include output previously generated by quality analyzer module 435 of brokerage system 4000, which determines and records data indicating how successfully each selected translation has satisfied requirements of a translation task brokered by system 4000. The records may also include knowledge stored in knowledgebase 420 that characterizes operational characteristics of the current engine inferred by the self-learning modules of system 4000. In some embodiments, this knowledge may be at least partly based on manually entered human inferences or judgements, in a manner consistent with generally accepted machine-learning, machine-training, and self-learning application technologies. For example, human users or administrators may submit rankings or score the degree of success of a translation based on parameters deemed relevant by an implementer or requesting source.

For example, the records may indicate that, in 200 out of 250 previous translation jobs, Engine 1 430a translated user input during an interactive chat quickly with real-timer response, or translated interactive user input more quickly than did any other engine 430b-430f. In this example, "real-time response" might be loosely defined as "response times brief enough to simulate response times expected from a human actor" or, more precisely, as response times that do not exceed an acceptable threshold duration of time. Brokerage system 4000 could then infer from translation logs that Engine 1 430a should be considered a strong candidate in interactive translation jobs where a user or other input source places a high priority on translation response time.

In some embodiments, a machine-learning subsystem or module of system 4000 could submit test content to extrinsic translation engines (distinct from any of the internal candidate engines) and use the results of those tests to infer the behavior of the candidate engines when performing similar translation tasks. For example, if a business needs to frequently translate 20-25-page documents from Spanish to German, system 4000 might submit similar documents to a variety of translation engines in order to determine how successfully those engines would satisfy the business's requirements or preferences when performing similar translation tasks. The system 4000 might also vary characteristics of the input in order to gather even more information, such as by submitting similar Spanish-to-German translation requests for documents of different lengths or requesting the translation of 20-25-page documents from German to Spanish or from Spanish to French.

Step 530 begins an inner-nested iterative procedure of steps 530-540, which is performed once for each parameter of the translation-pattern that is currently being tracked. In each iteration of this inner procedure, the system infers a value of the current parameter from the information received in step 520.

In some embodiments, all engines are characterized by a same set of pattern parameters. But in all cases, the total number of parameters in the set of parameters, and the choice of which parameters are included in the set, may be selected at will by an implementer.

The set of parameters may include any factors that an implementer has deemed relevant to the process of selecting a translation engine, including the engine's:
- overall performance or translation speed;
- overall accuracy;
- optimization to handle translation jobs that comprise a specific set of input or output languages;
- ability to handle translation tasks that generate output in multiple languages;
- service charges or fees;
- resource-consumption;
- security features, such the security or privacy of data as it is transferred between locations, the physical or geopolitical location and security of cached or other temporary copies of data, and the physical or geopolitical location of a translation engine and of other components that share network connections with the translation engine;
- connectivity or connection topology;
- ability to handle specialized language styles, such as scientific, medical, idiomatic, conversational, or technical prose;
- relative performance when translating very long or very short documents;
- ability to interpret incomplete sentences, ambiguous or vague language, or improper grammar; or
- ability to understand accents or to generate oral output that incorporates an accent.

Any of these parameters may be optionally constrained by a weighting that indicates the relative importance of that parameter to the selection process.

In step 540, system 4000 infers from the records a value for at least some of the set of parameters, where these inferred values describe characteristic behavior of the engine currently under consideration.

When evaluating an engine that has been optimized for one or more specific input languages, output languages, combination of input and output languages, or other characteristics of a translation job, system 4000 may derive a distinct set of parameter values for each language, combination, or characteristic. For example, if an engine has been optimized for English-to-Spanish translations, system 4000 may derive or infer a first set of parametric values that characterize the engine's cost, performance, accuracy, and other operational characteristics when translating English to Spanish and a second set of these parametric values that characterize the engine's operation or behavior when working with other combinations of languages.

At the conclusion of the final iteration of steps 530-540, system 4000 will have associated one or more sets of parametric values with the candidate engine currently being evaluated.

In step 550, system 4000 stores the information represented by the inferred parametric value in knowledgebase 420. Depending on implementation details, an implementer may choose to store this information as axioms, concepts, dependencies, simple metadata, tables, or in any other format or combination of formats that is used in fields related to artificial intelligence to represent knowledge. This stored information will allow system 4000 to characterize the engine being evaluated by the current iteration of steps 510-550 as a function of the set of parameters.

At the conclusion of the final iteration of steps 510-550, system 4000 will have associated at least one set of parametric values with each candidate engine. Each set of these parametric values quantify factors that characterize the performance or behavior of a corresponding engine when performing a particular type of translation job.

These characterizations may include dependencies among parameters. For example, one set of stored values may indicate that engine 1 430a is faster and more accurate than engine 2 430b when translating content between a pair of Romance languages, but begins to lose its relative speed advantage as the size of the input content increases. When system 4000 later selects an optimal translation engine, by means of the method of FIG. 6, knowledge based on these values tells system 4000 to consider the size of the input content when deciding whether engine 430a or 430b should be selected to translate input content from one Romance language to another.

Figure 6:
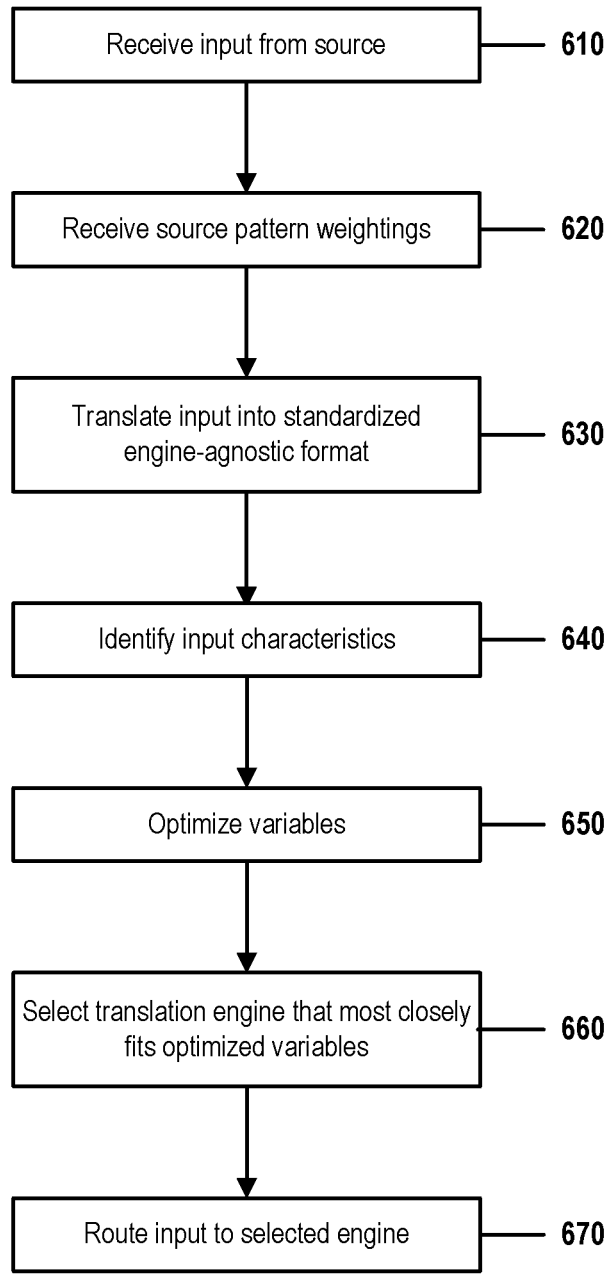
FIG. 6 is a flow chart that illustrates steps of a method for a self-learning, input-driven brokerage system for language-translation engines in accordance with embodiments of the present invention.

FIG. 6 is a flow chart that illustrates steps of a method for self-learning input-driven selection of language-translation engines in accordance with embodiments of the present invention. FIG. 6 contains steps 610-660, which may be performed by embodiments that incorporate the structures of FIGS. 1-4.

In step 610, input analyzer 410 or another module of system 4000 receives input content from an input source 400, as described in FIG. 4, along with a request to translate the input from its original language to a target language. As described above, the input content may be any natural-language text or language fragments, a set of words, or a pointer, network address, URL, or other identifier that identifies a location at which such input content is located.

System 4000 may also in this step receive translation metadata. This metadata would describe characteristics of the job, such as input and output languages, whether the input data was previously stored in its entirety or will be received interactively during translation, or other types of characteristics, including contextual information that would allow system 4000 to identify the input's class or category when a source is capable of generating more than one class or category of input.

In step 620, input analyzer 410 or another module of system 4000, receives a source-specific pattern of preferences or requirements of the source 400, either by receiving the preferences or requirements directly from the source or by retrieving previously stored values from a data repository or extrinsic data source. The pattern may represent the preferences or requirements in any manner known in the art, such as representing the preferences or requirements as values of a set of parameters, and may include any requirements or preferences deemed by the source or by an implementer of system 4000 to be potentially relevant to an engine selection. The preferences or requirements may be weighted to indicate each one's relative importance.

For example, input analyzer 410 may in this step retrieve from knowledgebase 420 a pair of 12-tuples, the first of which identifies twelve parameters that source 400 considers relevant when performing translation tasks of the type that was requested in step 610, and the second of which identifies values or weightings proportional to the relative importance to source 400 of each of the twelve parameters, when performing translation tasks of the type that was requested in step 610. Other embodiments are not limited to use of a pair of 12-tuples and may comprise any number of vectors that each contain any number of elements, or may represent stored knowledge in other formats, as desired by an implementer.

An input source may be associated with more than one set of pattern values. For example, if a business routinely performs two types of translations—French-to-English interactive speech translations and batched English-to-French document translations—the business may be associated with a distinct set of pattern values for each class or category of input. System 4000 could, for example, determine which set of pattern values to select by identifying characteristics of the input, by referring to a cross-reference table, or by receiving an explicit identification in the translation metadata file.

In some embodiments, the pattern received or retrieved in step 620 may be required to comprise values or weightings of at least some of the same translation-engine pattern parameters identified by the set of engine-pattern parameters described in FIGS. 4 and 5. In one example, the method of FIG. 5 associates each translation engine 430a-430f with a distinct set of values of parameters that specify each engine's relative speed, level of security, and cost. In step 620, system 4000 or input analyzer 410 would then receive or retrieve weightings that specify the input source's relative priorities of the same pattern (or set) of parameters. In this example, if each parameter can assume a value within the range of 1-10, with 10 being the most desirable value:

engine 430a might be associated with a relative speed of 3, a security level of 9, and a cost of 1, and engine 430b might be associated with a relative speed of 8, a security level of 2, and a cost of 8.

In this case, if system 4000 receives an input-source pattern in step 620 that assigns a weighting of 0.8 to the speed parameter, 0.1 to the security parameter, and 0.1 to the cost parameter, that pattern indicates that the input source considers translation speed to be approximately eight times as important as either security or cost. Engine 430b would thus initially appear to be a better choice for the job because the value of the "speed" parameter associated with engine 430*b* indicates that engine 430*b* is much faster than 430*a*.

In optional step 630, input analyzer 410 translates the received input into a standardized "engine-agnostic" format that is compatible with all candidate translation engines 430*a*-430*f*. This step may be omitted if all candidate engines are capable of understanding and processing the input in the input's received form.

Step 630 may also be performed if necessary to enable input analyzer 410 to infer characteristics of the input source directly from the input itself.

In step 640, input analyzer 410 infers or otherwise identifies characteristics of the input related to the translation job. These characteristics may be received from the source or retrieved from an extrinsic location, such as metadata optionally received in step 610 or 620. The characteristics may also be inferred through cognitive or non-cognitive methods, such as through pattern-matching or word-processing functions, or through cognitive analytics, semantic analytics, or other methods of artificial intelligence.

For example, analyzer 410 in this step may infer, or identify from received data, that the received input is a previously stored document consisting of 1250 natural-language words in the English language and Northern-England vernacular, has a high level of readability, is to be translated into a Mandarin dialect of Chinese, and is non-technical in nature.

In some embodiments, at least some of these inferences may be enabled by step 630's conversion of the raw input into a standardized form. In other cases, input analyzer 410 may be sufficiently trained to derive at least some of these inferences from the raw, unformatted input through technologies like cognitive analytics, natural-language processing, or natural-language recognition.

At the conclusion of step 640, the system 4000 will have:

i) received input to be translated or an identification of the input to be translated, either as a document or as a real-time oral or textual stream;

ii), received or inferred contextual information about the translation job and about the input. This information can include weights or rankings of the relative importance, to the source, of each pattern parameter for the type of input that was received; and iii) identifications of a set of translation engines 430, along with a set of pattern values for each engine that identifies that engine's relative strengths in each area tracked by a pattern parameter.

In step 650, optimizer module 415 of brokering system 4000 performs an optimization function that finds the minimal distance between the source's pattern values received in step 620, which identify the relative importance of each pattern parameter, with the pattern values of the translation engines 430 generated by the method of FIG. 5. At the conclusion of this optimization operation, the engine characterized by the pattern that is the minimal distance from the source's pattern is deemed to be the optimal translation engine for the current translation job.

In some embodiments, the optimization function will also optimize the variables or parameters that describe characteristics of the input. In other embodiments, there is no need to include the input parameters in the optimization operation because these characteristics will have already been accounted for when selecting the source pattern or a value or weighting comprised by one or more of the source pattern's parameters. For example, if the input consists of more than 1,000 words of conversational English, system 4000, upon determining these characteristics, may have requested and received a pattern that is already identified as being associated with translations of conversational English documents containing more than 1,000 words. Similarly, metadata received by system 4000 along with an input file may identify a pattern that has already been selected by an upstream system, or designated by a user, as being appropriate for the particular class or category of received input.

The optimization function may be performed by any known method of optimization function. If the current translation job consists of a one-to-one translation (that is, translation from one input language to one output language), any of numerous known convex functions may be employed to optimize the source's and the engine's patterns variables by finding the engine pattern that contains values that are minimally distant from the source pattern values.

Similarly, if the current translation is a multivariate translation, which translates a single input language into multiple output languages, optimizer 415 may perform the optimization with a non-convex function, such as a Lipschitz continuous function, in order to create the multi-variate regions needed for such an optimization in a Hilbert space or a Banach space.

Simpler embodiments may use other known statistical or multi-dimensional geometric methods to find an average minimum distance between a tensor with coordinates defined by the source pattern and the tensor with coordinates defined by a translation engine. Such embodiments may be efficient for simpler implementations, but larger implementations that comprise many sources, many pattern parameters, and many translation engines, will generally produce more efficient and accurate results by employing a more sophisticated convex or non-convex optimization function like those described above.

Other embodiments may comprise any other method of optimization desired by an implementer. In all cases, the output of the optimization step is an identification of an optimal translation engine that, based on the engine's pattern values and the source's pattern values, is the best fit for the requirements of the current translation job.

In step 660, optimizer 415 forwards the output of its optimization procedure to translation-engine broker module 425. Broker module 425, optionally using information stored in knowledgebase 420, selects the translation engine that has been identified as being the optimal engine for the current job.

In step 670, system 4000 initiates the translation job by routing input data to the selected engine, and directing the selected engine to forward its output back to the requesting source or user. In some embodiments, system 4000 does not expressly direct the selected engine to forward data to requesting sources, instead directing the selected engine to forward translated output to system 4000, allowing system 4000 to then forward the translated output to the requesting sources.

The translated output may also be monitored by, or stored and later retrieved by, a quality analyzer module 435 of system 4000 in order to use that output to further train components of system 4000 to more accurately select translation engines in the future. FIG. 7 describes this procedure in greater detail.

FIG. 7 is a flow chart that shows steps of a method for training a self-learning input-driven language-translation broker in accordance with embodiments of the present invention. FIG. 7 contains steps 710-770, which may be performed by embodiments that incorporate the structures of FIGS. 1-4.

In step 710, quality analyzer module 435 of system 4000 obtains the translated text output of a recent translation job, such as a translation produced by the method of FIG. 6. This translation may be captured from a selected engine of engines 430 as the engine transmits the output to a requesting user or other input source, or may be read from a stored copy of a previous translation.

System 4000 may also in this step identify contextual information or metadata associated with the translation job. This information or metadata may comprise an identification of the user or other source of the translation input, any characteristic of the translation input that had been identified in step 640 of FIG. 6, an identification of the translation engine of engines 430 that performed the translation, and any other metadata or other contextual data associated with the translation job.

In some cases, the translation output may have been produced by an extrinsic translation engine not comprised by engines 430. For example, if a business is planning to begin routinely translating articles of a German law journal into English, that business may have no historical records from which to begin inferring the relative strengths of engines 430 when performing this class of translation tasks. The business could, however, evaluate translation output produced by similar engines when servicing another company's similar translation tasks. In such cases, quality analyzer module 435 would perform the analysis upon translations generated by the extrinsic engines.

Step 720 begins a linguistic, syntactic, lexical, or semantic analysis of the output obtained in step 710. This analysis spans a first iterative procedure of steps 720-740, which is performed once for each translation parameter to be inferred from the translated output by the analysis. This analysis may be performed by any means known in the art and may combine any combination of known analytic procedures preferred by an implementer.

In step 730, quality analyzer 435 begins an inner loop of steps 720-740. Each iteration of this inner procedure evaluating one parameter of the text being analyzed. For example, a first iteration of steps 720-740 might quantify the readability of the text by performing a Flesch-Kincaid Reading Ease test, and a second iteration might score the text's grammatical accuracy by performing a grammar check similar to operations performed by popular word processors.

In some embodiments, all or some of the parameters analyzed in steps 720-740 may differ from the set of parameters comprised by the patterns that characterize input sources, translation engines, and translation inputs. Although the two may overlap, parameters analyzed by methods of FIG. 7 are produced by one or more linguistic, syntactic, lexical or semantic analytical procedure. In general, rather than describing characteristics of a translation engine like cost or speed, the parameters analyzed in steps 720-740 instead characterize qualities of the translated prose output of a translation engine In step 740, quality analyzer 435, as a function of the results of step 730, assigns a score to the parameter currently being analyzed.

At the conclusion of the last iteration of steps 720-740, quality analyzer 435 will have completed all phases of its analysis of the translation output and will have assigned values or scores to each analyzed parameter.

In step 750, quality analyzer 435 begins performing a second iterative procedure of steps 750-760. This second iterative procedure is performed once for each pattern parameter of a corresponding engine or input-source pattern, such as a parameter of an engine pattern or an input-source pattern like those described in the preceding figures.

In step 760, analyzer 435 evaluates how well the translated output performed as a function of the pattern parameter currently under evaluation. This evaluation may also take into consideration any contextual data received in step 710 and the parameter scores derived in the first iterative process of steps 720-740.

In one example, the contextual information identifies that the translation job's input document corresponds to a first pattern of five candidate patterns associated with translation engine 430*d*. This first pattern consists of two parameters: translation accuracy and speed. Analyzer 435 should then perform the second iterative procedure of steps 750-760 twice, once for each parameter.

In the first iteration, for example, analyzer 435 would assign a score to the accuracy parameter based on the results of the analysis performed by iterations of steps 720-740. This score could be proportional, at the discretion of an implementer, to the overall number or the density of grammatical, spelling, and other types of lexical errors found during the performance of steps 720-740.

In this example, during the second iteration, analyzer 435 would determine, from metadata received in step 710, the relative speed with which the translation job had been performed. Analyzer 435 would then assign an appropriate value to the speed parameter of the engine pattern that is proportional to the translation speed relative to the speed at which other translation engines are known to perform similar translation jobs.

In some embodiments, each iteration of the second iterative procedure will also consider how well the translation job satisfied a user or source preference identified by a weighting received in step 620 of the method of FIG. 6. In the running example, if the source weightings had comprised a weighting of 0.8 for the speed parameter and 0.2 for the accuracy parameter, analyzer 435 would revise its determination the relative success of the translation job by weighting the initial values computed in step 760 for each parameter.

At the conclusion of the final iteration of steps 720-760, analyzer 435 stores its results in a manner that allows translation-engine brokerage system 4000 to more accurately select translation engines in the future.

In some embodiments analyzer 435 uses its results to adjust the values of the engine-parameter pattern being analyzed in knowledgebase 420. This adjustment is performed as a function of the evaluations and scores derived in steps 750-760. For example, if steps 750-760 associate the translation output with the highest possible accuracy score, analyzer 435 would in step 770 adjust the stored accuracy pattern-parameter value accordingly, such as by averaging the new accuracy score with all previous accuracy scores previously used to derive the accuracy value stored in knowledgebase 420.

In other embodiments, analyzer 435 may use evaluations and scores derived in steps 750-760 to update rules, axioms, dependencies, or other types of knowledge stored in knowledgebase 420. For example, if the weighted scores derived in iterations of step 760 indicate that the selected translation engine produced output that best satisfies the weighted preferences of the source of the translation input, a rule of knowledgebase 420 may be adjusted to give greater precedence to that selected engine whenever the same source requests translation of a similar document.

In either case, some of this same information may be incorporated into a machine-language training corpus, to be used during machine-language training sessions to further optimizer module 415 or broker module 425 to more accurately select translation engines that best satisfy user requirements in the future.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A translation-engine brokerage system comprising a processor, a memory coupled to the processor, and a computer-readable hardware storage device coupled to the processor, the storage device containing program code configured to be run by the processor via the memory to implement a method for self-learning input-driven selection of language-translation engines, the method comprising:
    the processor receiving, from a content source, a request to translate verbal content from an input language into one or more output languages;
    the processor identifying a set of engine parameters,
        where operational characteristics of each engine of a set of candidate translation engines are represented by a distinct set of values of the engine parameters, and
        where the content source is associated with weightings that each represent a relative importance, to the content source, of a corresponding parameter of the engine parameters;
    the processor selecting a translation engine by optimizing the weightings, where the selected engine is an engine, of the set of candidate engines, that is associated with values of the engine parameters that most closely match the optimized weightings;
    the processor directing the verbal content to the selected engine; and
    the processor directing the resulting translated output of the selected engine to the content source.

2. The system of claim 1, further comprising:
    the processor representing characteristics of the verbal content as values of a set of content variables, where the set of engine parameters is chosen as a function of values of one or more variables of the set of content variables.

3. The system of claim 2, where the optimizing further comprises optimizing variables that represent both the weightings and a subset of the set of content variables.

4. The system of claim 1, where each parameter of the set of engine parameters is selected from the group consisting of: translation speed, translation accuracy, level of security, financial cost, resource efficiency, and sensitivity to a size of an input content.

5. The system of claim 1, further comprising:
    the processor performing a linguistic analysis upon the translated output; and
    the processor assigning to the selected engine, as a function of the weightings and of a result of the linguistic analysis, a satisfaction score proportional to how closely linguistic characteristics of the translated output satisfy a subset of the preferences represented by the weightings.

6. The system of claim 5, further comprising:
    the processor adjusting values of the engine parameters as a function of the satisfaction score, where the adjusted values are stored in a knowledgebase and represent operational characteristics of the selected engine.

7. The system of claim 5, further comprising:
    the processor updating an axiom stored in a knowledgebase as a function of the satisfaction score,
    where the axiom represents a rule for selecting a translation engine when the content source requests a translation job that translates input content from the input language into the one or more output languages, and
    where the updating adjusts the rule to more strongly or less strongly recommend the selected translation engine.

8. A method for self-learning input-driven selection of language-translation engines, the method comprising:
    a processor of a translation-engine brokerage system receiving, from a content source, a request to translate verbal content from an input language into one or more output languages;
    the processor identifying a set of engine parameters,
        where operational characteristics of each engine of a set of candidate translation engines are represented by a distinct set of values of the engine parameters, and
        where the content source is associated with weightings that each represent a relative importance, to the content source, of a corresponding parameter of the engine parameters;
    the processor selecting a translation engine by optimizing the weightings, where the selected engine is an engine, of the set of candidate engines, that is associated with values of the engine parameters that most closely match the optimized weightings;
    the processor directing the verbal content to the selected engine; and
    the processor directing the resulting translated output of the selected engine to the content source.

9. The method of claim 8, further comprising:
    the processor representing characteristics of the verbal content as values of a set of content variables, where the set of engine parameters is chosen as a function of values of one or more variables of the set of content variables.

10. The method of claim 9, where the optimizing further comprises optimizing variables that represent both the weightings and a subset of the set of content variables.

11. The method of claim 8, where each parameter of the set of engine parameters is selected from the group consisting of: translation speed, translation accuracy, level of security, financial cost, resource efficiency, and sensitivity to a size of an input content.

12. The method of claim 8, further comprising:
    the processor performing a linguistic analysis upon the translated output; and
    the processor assigning to the selected engine, as a function of the weightings and of a result of the linguistic analysis, a satisfaction score proportional to how closely linguistic characteristics of the translated output satisfy a subset of the preferences represented by the weightings.

13. The method of claim 12, further comprising:
    the processor adjusting values of the engine parameters as a function of the satisfaction score, where the adjusted values are stored in a knowledgebase and represent operational characteristics of the selected engine.

14. The method of claim 8, further comprising providing at least one support service for at least one of creating, integrating, hosting, maintaining, and deploying computer-readable program code in the computer system, wherein the computer-readable program code in combination with the computer system is configured to implement the receiving, the identifying, the selecting, the directing, and the returning.

15. A computer program product, comprising a computer-readable hardware storage device having a computer-readable program code stored therein, the program code configured to be executed by a translation-engine brokerage system comprising a processor, a memory coupled to the processor, and a computer-readable hardware storage device coupled to the processor, the storage device containing program code configured to be run by the processor via the memory to implement a method for self-learning input-driven selection of language-translation engines, the method for self-learning input-driven selection of language-translation engines, the method comprising:

receiving, from a content source, a request to translate verbal content from an input language into one or more output languages;

the processor identifying a set of engine parameters, where operational characteristics of each engine of a set of candidate translation engines are represented by a distinct set of values of the engine parameters, and where the content source is associated with weightings that each represent a relative importance, to the content source, of a corresponding parameter of the engine parameters;

the processor selecting a translation engine by optimizing the weightings, where the selected engine is an engine, of the set of candidate engines, that is associated with values of the engine parameters that most closely match the optimized weightings;

the processor directing the verbal content to the selected engine; and the processor directing the resulting translated output of the selected engine to the content source.

16. The computer program product of claim 15, further comprising:

the processor representing characteristics of the verbal content as values of a set of content variables, where the set of engine parameters is chosen as a function of values of one or more variables of the set of content variables.

17. The computer program product of claim 16, where the optimizing further comprises optimizing variables that represent both the weightings and a subset of the set of content variables.

18. The computer program product of claim 15, where each parameter of the set of engine parameters is selected from the group consisting of: translation speed, translation accuracy, level of security, financial cost, resource efficiency, and sensitivity to a size of an input content.

19. The computer program product of claim 15, further comprising:

the processor performing a linguistic analysis upon the translated output; and the processor assigning to the selected engine, as a function of the weightings and of a result of the linguistic analysis, a satisfaction score proportional to how closely linguistic characteristics of the translated output satisfy a subset of the preferences represented by the weightings.

20. The computer program product of claim 19, further comprising:

the processor adjusting values of the engine parameters as a function of the satisfaction score, where the adjusted values are stored in a knowledgebase and represent operational characteristics of the selected engine.

\* \* \* \* \*